United States Patent
Kimura

(10) Patent No.: US 7,478,199 B2
(45) Date of Patent: Jan. 13, 2009

(54) CACHE COLORING BASED ON DYNAMIC FUNCTION FLOW

(75) Inventor: Shigeru Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 10/921,986

(22) Filed: Aug. 20, 2004

(65) Prior Publication Data

US 2005/0210453 A1    Sep. 22, 2005

(30) Foreign Application Priority Data

Mar. 16, 2004   (JP)   ............................. 2004-074916

(51) Int. Cl.
  *G06F 12/08*   (2006.01)
(52) U.S. Cl. ................ 711/125; 711/123; 711/170
(58) Field of Classification Search ................ None
  See application file for complete search history.

(56) References Cited

U.S. PATENT DOCUMENTS 5,930,507 A   7/1999   Nakahira et al.

| | | | |
|---|---|---|---|
| 6,947,052 B2 * | 9/2005 | Jeremiassen | 345/557 |
| 2003/0097538 A1 * | 5/2003 | Hall et al. | 711/201 |

FOREIGN PATENT DOCUMENTS

| JP | 5-324281 | 12/1993 |
|---|---|---|
| JP | 7-084799 | 3/1995 |
| JP | 2000-056983 | 2/2000 |
| JP | 2001-216140 | 8/2001 |
| JP | 2001-282547 | 10/2001 |

\* cited by examiner

*Primary Examiner*—Gary J Portka
(74) *Attorney, Agent, or Firm*—Staas & Halsey LLP

(57) ABSTRACT

A method of performing cache coloring includes the steps of generating function strength information in response to a dynamic function flow representing a sequence in which a plurality of functions are called at a time of executing a program comprised of the plurality of functions, the function strength information including information about runtime relationships between any given one of a plurality of functions and all the other ones of the plurality of functions in terms of a way the plurality of functions are called, and allocating the plurality of functions to memory space in response to the function strength information such as to reduce instruction cache conflict.

9 Claims, 21 Drawing Sheets

| i \ j | A | B | C | D | E | F |
|---|---|---|---|---|---|---|
| A | 2 | 1 | 1 | 1 | 1 | 1 |
| B | 0 | 6 | 3 | 3 | 2 | 1 |
| C | 0 | 2 | 9 | 6 | 0 | 0 |
| D | 0 | 2 | 5 | 6 | 0 | 0 |
| E | 0 | 1 | 0 | 0 | 3 | 1 |
| F | 0 | 0 | 0 | 0 | 0 | 1 |

A B̲ C D C D C B̲ C D C D C B̲ C D C D C B E F E B̲ E B̲ A

| i \ j | A | B | C | D | E | F |
|---|---|---|---|---|---|---|
| A | 2 | 6/25 | 9/25 | 6/25 | 3/25 | 1/25 |
| B | 0 | 6 | 9/5 | 6/5 | 5/3 | 1/3 |
| C | 0 | 2 | 9 | 6 | 0 | 0 |
| D | 0 | 2/3 | 13/3 | 6 | 0 | 0 |
| E | 0 | 1 | 0 | 0 | 3 | 1 |
| F | 0 | 0 | 0 | 0 | 0 | 1 |

| i \ j | A | B | C | D | E | F |
|---|---|---|---|---|---|---|
| A | 2 | 6 | 9 | 6 | 3 | 1 |
| B | 0 | 6 | 9 | 6 | 3 | 1 |
| C | 0 | 2 | 9 | 6 | 0 | 0 |
| D | 0 | 2 | 7 | 6 | 0 | 0 |
| E | 0 | 1 | 0 | 0 | 3 | 1 |
| F | 0 | 0 | 0 | 0 | 0 | 1 |

A B C D C D C B C D C D C B C D C D C B E F E B E B A

| i \ j | A | B | C | D | E | F |
|---|---|---|---|---|---|---|
| A | 2 | 1 | 1/2 | 1/3 | 1/20 | 1/21 |
| B | 0 | 6 | 3 | 1.5 | 2 | 1/2 |
| C | 0 | 2 | 9 | 6 | 0 | 0 |
| D | 0 | 1 | 5 | 6 | 0 | 0 |
| E | 0 | 1 | 0 | 0 | 3 | 1 |
| F | 0 | 0 | 0 | 0 | 0 | 1 |

| a | ARRAY ELEMENT SEQUENCE NUMBER=0 |
| b | ARRAY ELEMENT SEQUENCE NUMBER=1 |
| c | ARRAY ELEMENT SEQUENCE NUMBER=2 |

FIG.14A

| | a | b | c |
|---|---|---|---|
| | 0 | 0 | 0 |

FIG.14B

| | a | b | c |
|---|---|---|---|
| a | 0 | 0 | 0 |
| b | 0 | 0 | 0 |
| c | 0 | 0 | 0 |

| a | b | c |
|---|---|---|
| 2 | 1 | 1 |

FIG.15C

|   | a | b | c |
|---|---|---|---|
| a | 2 | 1 | 1 |
| b | 0 | 0 | 0 |
| c | 0 | 0 | 0 |

| a | b | c |
|---|---|---|
| 1 | 1 | 0 |

FIG.16C

|   | a | b | c |
|---|---|---|---|
| a | 3 | 2 | 1 |
| b | 0 | 0 | 0 |
| c | 0 | 0 | 0 |

FIG.17A
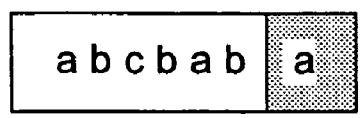
FIG.17B
| | a | b | c |
|---|---|---|---|
| | 0 | 0 | 0 |
FIG.17C
| | a | b | c |
|---|---|---|---|
| a | 3 | 2 | 1 |
| b | 0 | 0 | 0 |
| c | 0 | 0 | 0 |
FIG.18A
FIG.18B
| | a | b | c |
|---|---|---|---|
| | 0 | 2 | 1 |
FIG.18C
| | a | b | c |
|---|---|---|---|
| a | 3 | 2 | 1 |
| b | 0 | 2 | 1 |
| c | 0 | 0 | 0 |

FIG.19A
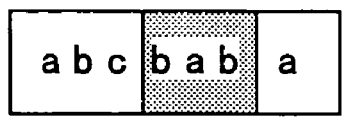
FIG.19B
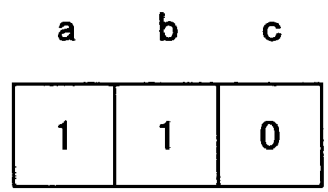
FIG.19C
|   | a | b | c |
|---|---|---|---|
| a | 3 | 2 | 1 |
| b | 1 | 3 | 1 |
| c | 0 | 0 | 0 |
FIG.20A
FIG.20B
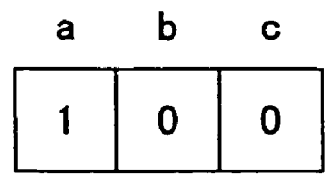
FIG.20C
|   | a | b | c |
|---|---|---|---|
| a | 3 | 2 | 1 |
| b | 1 | 3 | 1 |
| c | 0 | 0 | 0 |

FIG.21A

| a | b | c | b | a | b | a |

FIG.21B

| a | b | c |
|---|---|---|
| 0 | 0 | 1 |

FIG.21C

|   | a | b | c |
|---|---|---|---|
| a | 3 | 2 | 1 |
| b | 1 | 3 | 1 |
| c | 0 | 0 | 1 |

FIG.23

| i\j | A | B | C | D | E | F | M(i) |
|-----|---|---|---|---|---|---|------|
| A | 2 | 1 | 1 | 1 | 1 | 1 | 5 |
| B | 0 | 6 | 3 | 3 | 2 | 1 | 9 |
| C | 0 | 2 | 9 | 6 | 0 | 0 | 8 |
| D | 0 | 2 | 5 | 6 | 0 | 0 | 7 |
| E | 0 | 1 | 0 | 0 | 3 | 1 | 2 |
| F | 0 | 0 | 0 | 0 | 0 | 1 | 0 |

| CACHE LINE L0 | $n(B,E)+n(E,B)+n(D,E)+n(E,D)= 2+1+0+0$ |
|---|---|
| CACHE LINE L1 | $n(B,E)+n(E,B)+n(D,E)+n(E,D)= 2+1+0+0$ |
| CACHE LINE L2 | $n(C,E)+n(E,C)+n(D,E)+n(E,D)= 0+0+0+0$ |
| CACHE LINE L3 | $n(C,E)+n(E,C)+n(A,E)+n(E,A)= 0+0+1+0$ |
| CACHE LINE L4 | $n(C,E)+n(E,C)$  $= 0+0$ |
| CACHE LINE L5 | $n(D,E)+n(E,D)$  $= 0+0$ |
| CACHE LINE L6 | $n(D,E)+n(E,D)$  $= 0+0$ |
| CACHE LINE L7 | $n(D,E)+n(E,D)$  $= 0+0$ |

31  6  4  0
| | tag | |

CORRESPONDING
CACHE LINE NUMBER

| CACHE LINE NUMBER | ADDRESS FOR ALLOCATION |
|---|---|
| L0 | xxxx xx0x |
| L1 | xxxx xx1x |
| L2 | xxxx xx2x |
| L3 | xxxx xx3x |
| L4 | xxxx xx4x |
| L5 | xxxx xx5x |
| L6 | xxxx xx6x |
| L7 | xxxx xx7x |

| L | 0 | 1 | 2 | 3 | ... | 7 |
|---|---|---|---|---|---|---|
| A | 1 | 0 | 0 | 0 | 0 | 0 |
| B | 0.7 | 0.3 | 0 | 0 | 0 | 0 |
| C | 0.1 | 0.8 | 0.1 | 0 | 0 | 0 |
| D | 0.8 | 0.1 | 0 | 0.1 | 0 | 0 |
| E | 0.1 | 0.3 | 0.6 | 0 | 0 | 0 |
| F | 0.3 | 0.4 | 0.3 | 0 | 0 | 0 |

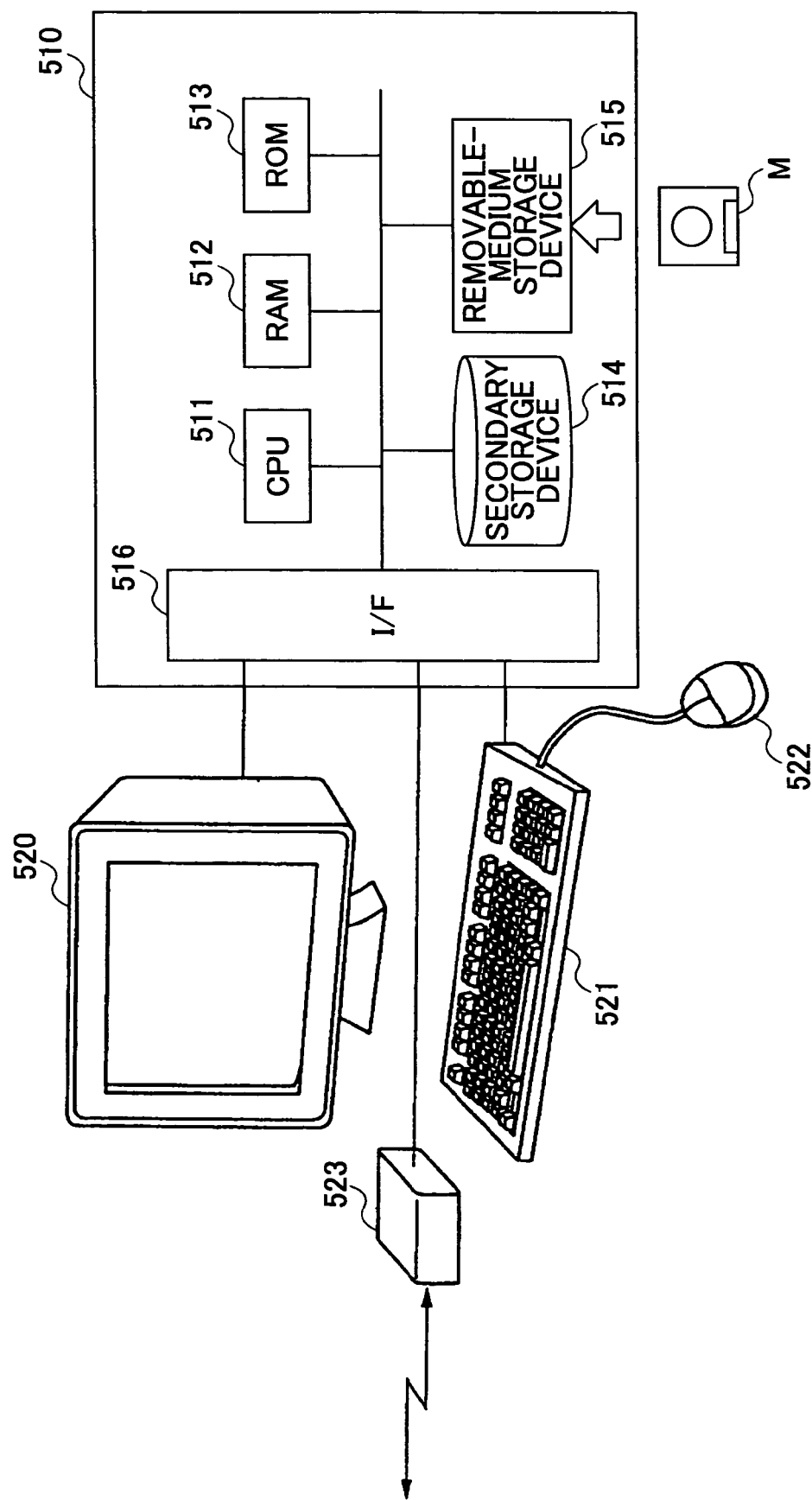

CACHE COLORING BASED ON DYNAMIC FUNCTION FLOW

CROSS-REFERENCE TO RELATED APPLICATIONS

The present application is based upon and claims the benefit of priority from the prior Japanese Patent Application No. 2004-074916 filed on Mar. 16, 2004, with the Japanese Patent Office, the entire contents of which are incorporated herein by reference.

BACKGROUND OF THE INVENTION

1. Field of the Invention

The present invention generally relates to methods of allocating functions to memory space, and particularly relates to a cache coloring method that allocates functions to memory space such as to reduce the possibility of cache conflict.

2. Description of the Related Art

In computer systems, generally, high-speed, small capacity cache memories are provided in addition to main memories. A portion of the information stored in the main memories is copied to a cache. When this information is accessed, the information is retrieved from the cache rather than from the main memories, thereby achieving high-speed information retrieval.

As caches are capable of high-speed operations and thus more expensive than main memories, their storage capacity is very small. A cache contains a plurality of cache lines, and the copying of information from external memory (main memory) to the cache is performed on a cache-line-by-cache-line basis. Because of this, the memory space of the external memory is divided in the units of cache lines, and the divided memory areas are successively allocated to the cache lines in advance. Since the capacity of the cache is smaller than the capacity of the external memory, the memory areas of the external memory are repeatedly allocated to the same cache lines.

When an access is first made to a given address, information (data or a program) stored in this address is copied to a corresponding cache line in the cache. When a next access is made to the same address, the information is directly retrieved from the cache.

When program functions are to be executed, different program functions allocated to different addresses in the external memory may be allocated to the same cache line. In this case, one of the program functions needs to be copied to the cache at every turn when the program functions are alternately called. This is referred to as cache conflict. The problem is that the more frequent the occurrence of cache conflict, the slower the execution speed of the programs is. In order to obviate this problem, it is preferable to avoid allocating functions having the high likelihood of simultaneous executions to the same cache line, and research efforts have been made to this end.

Caches include an instruction cache and a data cache. The above-noted problem of function retrieval occurs with respect to the instruction cache. Methods of mapping cache memory generally include a direct method, a set-associative method, and a full-associative method. When considering the above-noted problem of cache conflict, it does not matter which one of these three methods is employed. In the following description, thus, the direct map method will be used as an example.

In order to obviate the problem of cache conflict, the strength of function is defined as an indication of the number of calls between functions and the number of calls of a specific function-calling pattern. In the related art, there is a method by which functions having the great strength of function (i.e., there is a high possibility of the functions calling each other) are not allocated to the same cache line. Setting and modifying of link sequences on a function-specific basis for the purpose of reducing cache conflict and instruction cache miss is called cache coloring.

Patent Documents No. 1 through No. 3 disclose methods of allocating codes in a descending order of the number of calls. Patent Document No. 4 discloses a method of reducing cache conflict. In this method, information about a time series of functions is extracted, and the patterns of execution of function combinations by which cache conflict may possibly occur are detected based on the time-series information in addition to the direct calling of functions such as consecutive calling of functions. Cache conflict is then reduced by using the number of executions of a pattern in which a plurality of functions are consecutively called from a given function or called within a loop. Patent Document No. 5 discloses a method that obtains, through tentative allocation, patterns executed a large number of times among specific patterns in which a plurality of functions are consecutively called from a given function or called within a loop. Patent Document No. 6 discloses a method by which functions called by a loop having high frequency of execution are successively allocated by generating and referring to the a structure graph.

[Patent Document No. 1] Japanese Patent Application Publication No. 5-324281

[Patent Document No. 2] Japanese Patent Application Publication No. 7-84799

[Patent Document No. 3] Japanese Patent Application Publication No. 8-328870

[Patent Document No. 4] Japanese Patent Application Publication No. 2001-216140

[Patent Document No. 5] Japanese Patent Application Publication No. 2001-282547

[Patent Document No. 6] Japanese Patent No. 3309810

[Non-patent Document No. 1] Keisuke Hashimoto, Hideki Ando, Toshio Shimada, "Reallocation of codes in the Units of Basic Blocks for Reduction of Instruction Cache Miss," 1999 Parallel Processing Symposium, JSPP'99, June of 1999, pp. 31-38

SUMMARY OF THE INVENTION

It is a general object of the present invention to provide a cache coloring method that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a cache coloring method particularly pointed out in the specification in such full, clear, concise, and exact terms as to enable a person having ordinary skill in the art to practice the invention.

To achieve these and other advantages in accordance with the purpose of the invention, the invention provides a method of performing cache coloring, which includes the steps of generating function strength information in response to a dynamic function flow representing a sequence in which a plurality of functions are called at a time of executing a program comprised of the plurality of functions, the function strength information including information about runtime relationships between any given one of a plurality of functions and all the other ones of the plurality of functions in terms of a way the plurality of functions are called, and allocating the plurality of functions to memory space in response to the function strength information such as to reduce instruction cache conflict.

According to at least one embodiment of the invention, relationships between functions as to the way the functions are called are traced at the time of program execution, thereby generating the dynamic function flow. Based on the dynamic function flow, the function strength information is generated that includes information about the runtime relationships between all the functions as to the way the functions are called. The function strength information represents mutual relationships between functions (relationships between any given function and all the other functions), which was impossible in the conventional art. The use of such information makes it possible to provide the optimum allocation of functions that minimizes the number of instruction cache misses.

BRIEF DESCRIPTION OF THE DRAWINGS

Other objects and further features of the present invention will be apparent from the following detailed description when read in conjunction with the accompanying drawings, in which:

FIG. 3 is an illustrative drawing for explaining a function strength n(B, D) with respect to the dynamic function flow of FIG. 2;

FIG. 4 is a diagram showing a matrix representing function strength information;

FIG. 8 is an illustrative drawing for explaining a function strength n**(B, D) with respect to the dynamic function flow of FIG. 2;

FIG. 9 is a diagram showing a matrix representing function strength information;

FIGS. 13A and 13B are illustrative drawings showing an operation flow and a function list table, respectively;

FIG. 14A is an illustrative drawing showing the function strength area of an extracted section;

FIG. 14B is an illustrative drawing showing a function strength matrix area;

FIGS. 15A through 15C are illustrative drawings showing a first extracted section, the function strength area of the extracted section, and the function strength matrix area in a case where the start point of extraction is set to the first function "a" of the function list table;

FIGS. 16A through 16C are illustrative drawings showing a second extracted section, the function strength area of the extracted section, and the function strength matrix area in the case where the start point of extraction is set to the first function "a" of the function list table;

FIGS. 17A through 17C are illustrative drawings showing a third extracted section, the function strength area of the extracted section, and the function strength matrix area in the case where the start point of extraction is set to the first function "a" of the function list table;

FIGS. 18A through 18C are illustrative drawings showing a first extracted section, the function strength area of the extracted section, and the function strength matrix area in a case where the start point of extraction is set to the second function "b" of the function list table;

FIGS. 19A through 19C are illustrative drawings showing a second extracted section, the function strength area of the extracted section, and the function strength matrix area in the case where the start point of extraction is set to the second function "b" of the function list table;

FIGS. 20A through 20C are illustrative drawings showing a third extracted section, the function strength area of the extracted section, and the function strength matrix area in the case where the start point of extraction is set to the second function "b" of the function list table;

FIGS. 21A through 21C are illustrative drawings showing a first extracted section, the function strength area of the extracted section, and the function strength matrix area in a case where the start point of extraction is set to the third function "c" of the function list table;

FIG. 23 is a diagrams showing function M(i) corresponding to the function strength information of FIG. 4;

FIG. 24 is an illustrative drawing showing a sequence of functions that are arranged according to the first embodiment of the function allocating method when the function strength information of FIG. 4 is used;

FIG. 26 is an illustrative drawing showing a series of functions allocated according to the second embodiment of the function allocating method when the function strength information of FIG. 4 is used;

FIG. 35 is an illustrative drawing showing the construction of an apparatus for performing cache coloring according to the invention.

DESCRIPTION OF THE PREFERRED EMBODIMENTS

The strength of function used in the related art is simply based on the number of calls obtained from the number of occurrences that a series of instructions within a given function call other functions, or is simply based on the number of calls of particular function-calling patterns that take into account the sequence of calls. The related-art strength of function thus fails to take into consideration correlation between functions in a time series at the time of execution. Accordingly, when cache coloring is performed based on the related-art strength of function, the allocation of functions may not be proper at the time of actual execution of programs. Thus, cache conflict cannot be suppressed as much as expected.

Accordingly, there is a need for a cache coloring method that takes into account runtime mutual relationships between functions.

In the following, embodiments of the present invention will be described with reference to the accompanying drawings.

Figure 1:
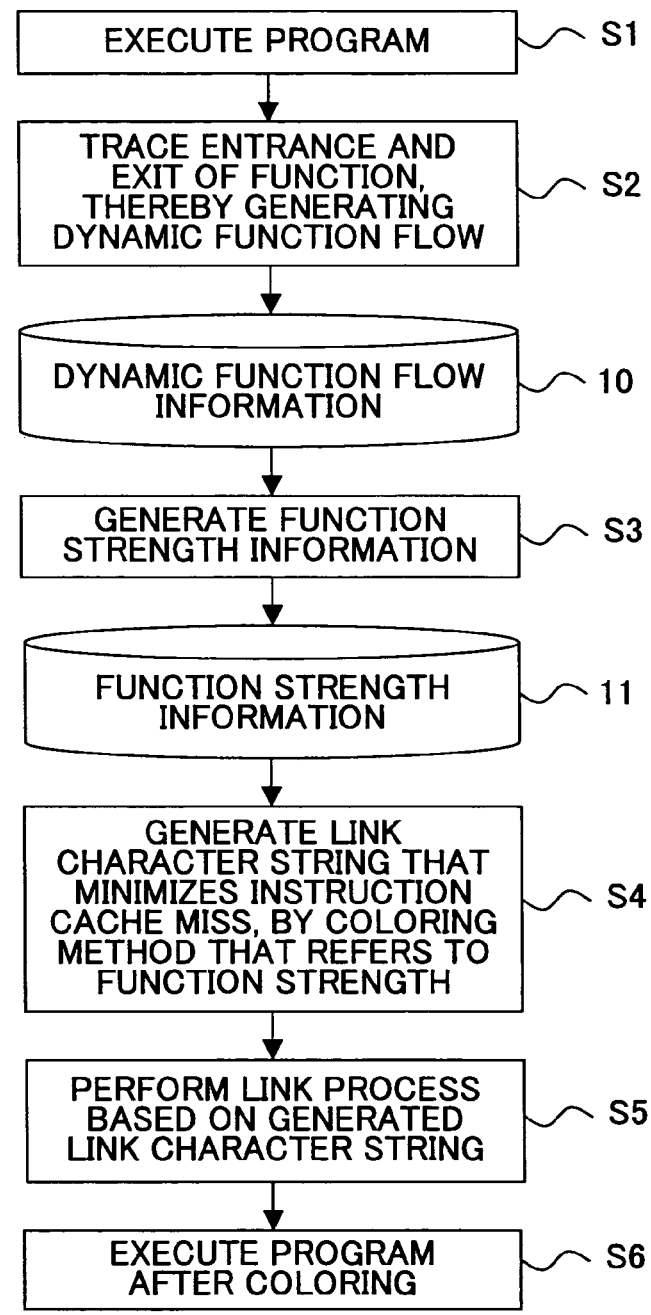
FIG. 1 is a flowchart showing an embodiment of a cache coloring method according to the invention.

FIG. 1 is a flowchart showing an embodiment of a cache coloring method according to the invention.

At step S1 of FIG. 1, a program to be subjected to cache coloring is executed by use of a simulator or the like. At step S2, the entrance and exit of functions are traced, thereby generating a dynamic function flow 10. The dynamic function flow 10 is a time series in which functions called at the time of program execution are arranged in the order of calls (in the order of executions). The dynamic function flow 10 directly reflects relationships between functions as to the way the functions are called at the time of execution. The generation of the dynamic function flow 10 will be described later in detail.

At step S3, function strength information 11 is generated based on the dynamic function flow 10. The function strength information 11 includes time-sequence information about all the functions in addition to information about the number of calls and the sequence of calls that are included in the related-art strength of function. The generation of the function strength information 11 will be described later in detail.

At step s4, a link character string that minimizes instruction cache miss is generated by coloring that refers to the function strength information 11. The generation of the link character string will be described later in detail. At step S5, a linker allocates functions to memory space and links the functions based on the generated link character string, thereby generating an executable module. At step S6, the generated executable module is executed to execute the program to which coloring has been performed.

In the present invention as described above, relationships between functions as to the way the functions are called are traced at the time of program execution, thereby generating the dynamic function flow 10 that is a time sequence indicative of the runtime relationship between functions as to the way the functions are called. Based on the dynamic function flow 10, the function strength information 11 is generated that includes information about the runtime relationships between all the functions as to the way the functions are called. The function strength information 11 represents mutual relationships between functions (relationships between any given function and all the other functions), which was impossible in the conventional art. The use of such information makes it possible to provide the optimum allocation of functions that minimizes the number of instruction cache misses.

As the direct method can be regarded as a set-associative method in the case of a cache way of "1", a set-associative method including a direct method will be used as an example in the following description.

A description will first be given of the extraction of the dynamic function flow 10.

Figure 2:
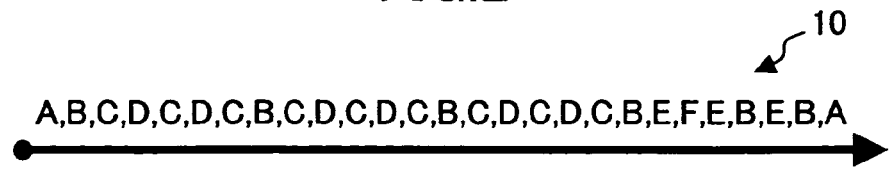
FIG. 2 is an illustrative drawing showing an example of a dynamic function flow in a case where a program comprised of functions A, B, C, D, E, and F is executed.

A program of interest includes functions A, B, C, D, E, and F, and is executed by a simulator. The entrance and exit of the individual functions A, B, C, D, E, and F are traced, recording in sequence all functions that are called from the start to the end of the program execution, thereby generating a time series of functions. FIG. 2 is an illustrative drawing showing an example of the dynamic function flow 10 in a case where the program comprised of the functions A, B, C, D, E, and F is executed. The function A is executed first, followed by the execution of the function B called by the function A. Thereafter, functions are successively called and executed in the sequence of C, D, C, D, C, B, and so on.

In the following, a description will be given of the generation of the function strength information 11 based on the dynamic function flow 10.

A first embodiment (basic type) of the function strength information 11 will be described first.

"Rij" denotes a set of sections, each of which extends from reference to a function i to first reference to a function j (including i and excluding j). Among all the sections that are Rii, the number of sections in which the function j is referred to at least once is obtained from the dynamic function flow, and is denoted as $n(i, j)$. If $i=j$, $n(i, j)$ is regarded as the total number of references to the function i. The function strength is defined as $n(i, j)$ obtained in this manner.

$n(i, j)$ is equal to the number of cache misses that occur when the function i and function j ($\neq i$) are allocated to the same cache line. Namely, $n(i, j)$ defines the function strength by the magnitude of cache conflict. The larger the function strength $n(i, j)$, the larger an effect on the cache. Provision is thus made to avoid allocating functions having a large function strength $n(i, j)$ with respect to each other to the same cache line, and to allocate functions having a small $n(i,j)$ with respect to each other to the same cache line. This reduces the possibility of cache conflict.

FIG. 3 is an illustrative drawing for explaining a function strength $n(B, D)$ with respect to the dynamic function flow 10 of FIG. 2. As shown by underlines having different appearances in FIG. 3, there are five sections RBB of the function B (i.e., sections extending until the function B appears next time). Among the five sections $R_{BB}$, three of them include at least one reference to D. $n(B, D)$ is thus 3. By obtaining strength functions for all the combinations of functions in the same manner, a matrix as shown in FIG. 4 is obtained. The matrix shown in FIG. 4 is the function strength information 11.

In the following, a second embodiment of the function strength information 11 will be described.

In the second embodiment, the function strength $n(i, j)$ of the first embodiment is improved. The function strength $n(i,j)$ of the first embodiment indicates the number of sections in which the function j is referred to at least once, and is equivalent to the number of cache misses that occur when the function i and the function j ($\neq i$) are allocated to the same cache line. In the function strength $n(i, j)$ of the first embodiment, however, no consideration is given to the number of references to functions that are called within a given section.

Figures 5, 6, 7:
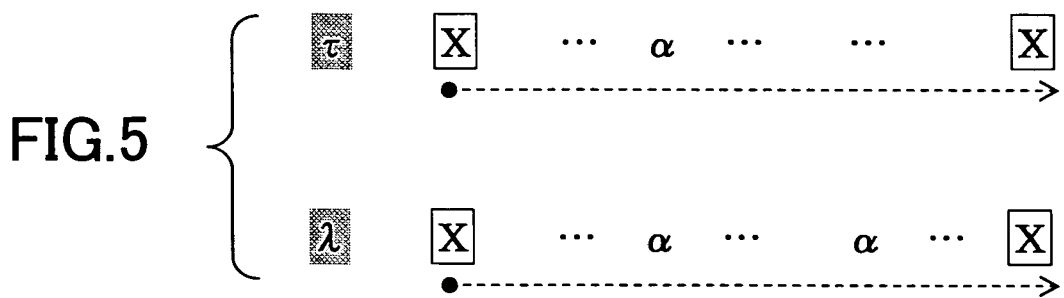
FIG. 5 is an illustrative drawing for explaining a rate of cache reuse.
FIG. 6 is an illustrative drawing for explaining a function strength n*(B, D) with respect to the dynamic function flow of FIG. 2.
FIG. 7 is a diagram showing a matrix representing function strength information.

In the second embodiment, a rate of cache reuse is added as a factor to be taken into consideration. FIG. 5 is an illustrative drawing for explaining a rate of cache reuse. In a case λ shown in FIG. 5, the number of occurrences that a function α is called is larger than in a case τ, so that the locality of a program with respect to the function α is larger. The rate of cache reuse is thus believed to be high. Here, the rate of cache reuse is proportional to the number of references to a function called during the section of interest. New function strength information n*(i, j) is defined by incorporating the rate of cache reuse into the function strength n(i, j) of the first embodiment.

Namely, the function strength information n*(i, j) that takes into account the rate of cache reuse with respect to the function j (≠i) in a section belonging to Rii is defined as:

$$n*(i, j)=\Sigma(1\times Ref(k)/R(k))$$

wherein R(k) is the number of references to all the functions in a section k belonging to Rii, and Ref(k) is the number of references to the function j (≠i) in the section k belonging to Rii.

FIG. 6 is an illustrative drawing for explaining a function strength n*(B, D) with respect to the dynamic function flow 10 of FIG. 2. As shown by different underlines having respective appearances in FIG. 6, there are five sections RBB of the function B (i.e., sections extending until the function B appears next time). Among the five sections $R_{BB}$, the frequency of occurrences of the function D is 2/5 in the first section, 2/5 in the second section, 2/5 in the third section, 0/3 in the fourth section, and 0/1 in the fifth section. Accordingly, the function strength n*(B, D) becomes as follows.

$$n*(B, D)=1\times 2/5+1\times 2/5+1\times 2/5+1\times 0/3+1\times 0/1=1.2$$

By obtaining strength functions for all the combinations of functions in the same manner, a matrix as shown in FIG. 7 is obtained. The matrix shown in FIG. 7 is the function strength information 11 according to the second embodiment.

The larger the function strength n*(i, j), the larger an effect on the cache is, and the higher the rate of cache reuse is. Accordingly, the allocation of functions having a large function strength n*(i, j) with respect to each other to different cache lines makes it possible to reduce cache conflict.

In the following, a third embodiment of the function strength information 11 will be described.

In the third embodiment, the function strength n*(i, j) of the second embodiment is improved. In the second embodiment described above, the locality of a program, i.e., the rate of cache reuse, is derived from a ratio of the number of references to the function of interest to the number of references to all the functions. When the number of cache misses is of interest, however, the ratio with respect to the number of references to all the functions is not important. Rather, how many times the function of interest is called and how many times cache conflicts occur become important.

In the third embodiment, function strength information n**(i, j) is defined as:

$$n**(i, j)=\Sigma(1\times Ref(k))$$

where Ref(k) is the number of references to the function j (≠i) in the section k belonging to Rii.

FIG. 8 is an illustrative drawing for explaining a function strength n(B, D) with respect to the dynamic function flow 10 of FIG. 2. As shown by different underlines having respective appearances in FIG. 8, there are five sections $R_{BB}$ of the function B (i.e., sections extending until the function B appears next time). Among the five sections $R_{BB}$, the number of occurrences of the function D is 2 in the first section, 2 in the second section, 2 in the third section, 0 in the fourth section, and 0 in the fifth section. Accordingly, the function strength n(B, D) becomes as follows.

$$n**(B, D)=1\times 2+1\times 2+1\times 2+1\times 0+1\times 0=6$$

By obtaining strength functions for all the combinations of functions in the same manner, a matrix as shown in FIG. 9 is obtained. The matrix shown in FIG. 9 is the function strength information 11 according to the third embodiment.

The larger the function strength n(i, j), the larger an effect on the cache is, and the larger the number of cache misses is. Accordingly, the allocation of functions having a large function strength n(i, j) with respect to each other to different cache lines makes it possible to reduce cache conflict.

In the following, a fourth embodiment of the function strength information 11 will be described.

In the fourth embodiment, the function strength n(i, j) of the first embodiment is improved. The function strength n(i, j) of the first embodiment previously described does not take into account information about positions at which the function of interest is called in a given section. That is, when a particular function is of interest in a given section, the number of cache misses is considered to be the same even if the position at which the function of interest is referred to in this given section is different.

Figures 10, 11, 12:
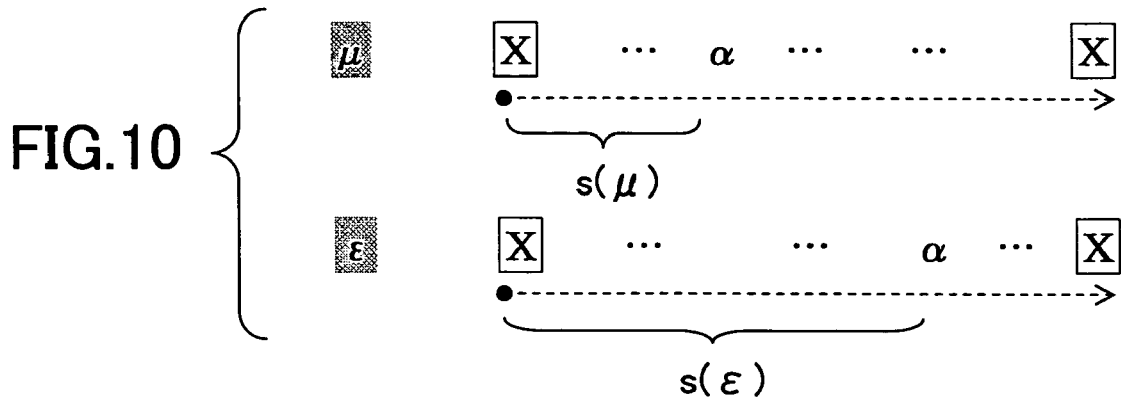
FIG. 10 is an illustrative drawing for explaining the locality of a program.
FIG. 11 is an illustrative drawing for explaining a function strength n#(B, D) with respect to the dynamic function flow of FIG. 2.
FIG. 12 is a diagram showing a matrix representing function strength information.

In the fourth embodiment, on the other hand, the locality of a program is added as a factor to be taken into consideration. As a measure of the locality of a program, a time distance that passes before the function of interest is first referred to in a given section is used. Such time distance is an indication of a time period that passes before a cache miss occurs when a plurality of functions are allocated to the same cache line. FIG. 10 is an illustrative drawing for explaining the locality of a program. In FIG. 10, a time distance s(μ) in a case μ is shorter than a time distance s(ε) in a case ε, so that the locality of a program is considered to be larger in the case μ. The locality of a program is inversely proportional to the time distance of a program, i.e., the time that passes before a cache miss occurs when functions are allocated to the same cache lines.

In the fourth embodiment, function strength information n#(i, j) that takes into account the locality of a program from the function i to the function j with respect to the function j (≠i) in a section belonging to Rii is defined as:

$$n\#(i, j)=\Sigma(1/\text{Len}(k))$$

wherein Len(k) is a distance (≠0) to the first reference of the function j (≠i) in the section k belonging to Rii.

FIG. 11 is an illustrative drawing for explaining a function strength n#(B, D) with respect to the dynamic function flow 10 of FIG. 2. As shown by different underlines having respective appearances in FIG. 11, there are five sections RBB of the function B (i.e., sections extending until the function B appears next time). Among the five sections RBB, a time distance to the first reference of the function D is 2 in the first section, 2 in the second section, and 2 in the third section. Accordingly, the function strength n#(B, D) becomes as follows.

$$N\#(B, D)=1/2+1/2+1/2=1.5$$

By obtaining strength functions for all the combinations of functions in the same manner, a matrix as shown in FIG. 12 is obtained. The matrix shown in FIG. 12 is the function strength information 11 according to the fourth embodiment.

The larger the function strength n#(i, j), the larger an effect on the cache is, and the greater the locality of a program is, with the shorter time period before a cache miss occurs. Accordingly, the allocation of functions having a large function strength $n\#(i, j)$ with respect to each other to different cache lines makes it possible to reduce cache conflict.

In the following, a procedure for generating the function strength information 11 will be described. In the following description, the first example previously described is taken as an example.

FIGS. 13A and 13B are illustrative drawings showing an operation flow and a function list table, respectively. For the sake of explanation, a procedure for generating the function strength information 11 will be described with respect to a simple operation flow shown in FIG. 13A. FIG. 13B shows a function list table with respect to three functions "a", "b", and "c" appearing in the operation flow of FIG. 13A.

Based on the function list table, a function strength area (occurrence recording area) of an extracted section is generated as a one-dimensional array comprised of as many data items as there are in the function list table. In this example, thus, the function strength area of an extracted section is generated as a one-dimensional array comprised of three elements. Further, a two-dimensional array is generated as a function strength matrix area having a matrix form, which is comprised of as many data items in one dimension as there are in the function list table and as many data items in the other dimension as there are in the function list table. In this case, a 3-x-3 matrix area is obtained. FIG. 14A illustrates the function strength area of an extracted section, and FIG. 14B illustrates the function strength matrix area.

FIGS. 15A through 15C are illustrative drawings showing a first extracted section, the function strength area of the extracted section, and the function strength matrix area in the case where the start point of extraction is set to the first function "a" of the function list table. In FIG. 15A, a first extracted section Raa that has the start point of extraction at the position of the function "a" is shown as a dotted area. In FIG. 15B, data of the function strength area of the extracted section shown in FIG. 15A are shown. In the function strength area of the extracted section, data "1" is set for functions that appear one or more times in the extracted section of interest. With respect to the function "a" that marks the start point of the extracted section, however, the number of occurrences, i.e., "2", is set as data. The data of the function strength area of the extracted section are copied to the corresponding areas of the function strength matrix shown in FIG. 15C.

FIGS. 16A through 16C are illustrative drawings showing a second extracted section, the function strength area of the extracted section, and the function strength matrix area in the case where the start point of extraction is set to the first function "a" of the function list table. In FIG. 16A, a second extracted section Raa that has the start point of extraction at the position of the function "a" is shown as a dotted area. In FIG. 16B, data of the function strength area of the extracted section shown in FIG. 16A are shown. In the function strength area of the extracted section, data "1" is set for functions that appear one or more times in the extracted section of interest. The number of occurrences is 2 with respect to the function "a" that marks the start point of the extracted section. In the second and following extracted sections, however, the function "a" marking the start point of an extracted section has already been counted in the preceding section, so that the function at the start point of extraction is not included in counting. The data of the function strength area of the extracted section are added to the corresponding areas of the function strength matrix shown in FIG. 16C.

FIGS. 17A through 17C are illustrative drawings showing a third extracted section, the function strength area of the extracted section, and the function strength matrix area in the case where the start point of extraction is set to the first function "a" of the function list table. In FIG. 17A, a third extracted section Raa that has the start point of extraction at the position of the function "a" is shown as a dotted area. In this case, the function "a" is not in existence after the start point of extraction, so that it is ascertained that an extracted section cannot be established. As a result, no action is taken to incorporate the data of the function strength area of the extracted section into the corresponding areas of the function strength matrix shown in FIG. 17C.

FIGS. 18A through 18C are illustrative drawings showing a first extracted section, the function strength area of the extracted section, and the function strength matrix area in the case where the start point of extraction is set to the second function "b" of the function list table. In FIG. 18A, a first extracted section Raa that has the start point of extraction at the position of the function "b" is shown as a dotted area. In FIG. 18B, data of the function strength area of the extracted section shown in FIG. 18A are shown. In the function strength area of the extracted section, data "1" is set for functions that appear one or more times in the extracted section of interest. With respect to the function "b" that marks the start point of the extracted section, however, the number of occurrences, i.e., "2", is set as data. The data of the function strength area of the extracted section are copied to the corresponding areas of the function strength matrix shown in FIG. 18C.

FIGS. 19A through 19C are illustrative drawings showing a second extracted section, the function strength area of the extracted section, and the function strength matrix area in the case where the start point of extraction is set to the second function "b" of the function list table. In FIG. 19A, a second extracted section Raa that has the start point of extraction at the position of the function "b" is shown as a dotted area. In FIG. 19B, data of the function strength area of the extracted section shown in FIG. 19A are shown. In the function strength area of the extracted section, data "1" is set for functions that appear one or more times in the extracted section of interest. The number of occurrences is 2 with respect to the function "b" that marks the start point of the extracted section. In the second and following extracted sections, however, the function "b" marking the start point of an extracted section has already been counted in the preceding section, so that the function at the start point of extraction is not included in counting. The data of the function strength area of the extracted section are added to the corresponding areas of the function strength matrix shown in FIG. 19C.

FIGS. 20A through 20C are illustrative drawings showing a third extracted section, the function strength area of the extracted section, and the function strength matrix area in the case where the start point of extraction is set to the second function "b" of the function list table. In FIG. 20A, a third extracted section Raa that has the start point of extraction at the position of the function "b" is shown as a dotted area. In this case, the function "b" is not in existence after the start point of extraction, so that it is ascertained that an extracted section cannot be established. As a result, no action is taken to incorporate the data of the function strength area of the extracted section into the corresponding areas of the function strength matrix shown in FIG. 20C.

FIGS. 21A through 21C are illustrative drawings showing a first extracted section, the function strength area of the extracted section, and the function strength matrix area in the case where the start point of extraction is set to the third function "c" of the function list table. In FIG. 21A, a first extracted section Raa that has the start point of extraction at the position of the function "c" is shown as a dotted area. In this case, the function "c" is not in existence after the start point of extraction, so that it is ascertained that an extracted section cannot be established. This results in an abnormal situation in which no extracted section is present that has the function "c" as the start point of extraction. In this case, thus, only the function "c" at the start point of extraction is counted in order to generate the data of the function strength area of the extracted section. The data of the function strength area of the extracted section are copied to the corresponding areas of the function strength matrix shown in FIG. 18C.

In the manner as described above, functions are successively selected from the top of the function list table, and an extracted section is established with respect to each one of the selected functions, thereby generating the function strength area of the extracted section by using data indicative of whether respective functions appear in the extracted section. The data of the function strength area of the extracted section generated in this manner are successively reflected in the function strength matrix, thereby generating the function strength information 11 of the first embodiment.

In the procedure described above for generating the function strength information 11 of the first embodiment, the occurrence recording area having data indicative of whether respective functions appear is used as the function strength area of an extracted section. With respect to the second through fourth embodiments, the function strength information 11 is readily obtained in the similar manner by employing a number-of-occurrence recording area having data indicative of the numbers of occurrences of respective elements in a given section, a total-number-of-extracted-section-data-item recording area having data indicative of the total number of data items in a given section, and a first-occurrence-sequence recording area having data indicative of a sequence up to the occurrence of a first element, etc.

In the following, a description will be given of a method of allocating functions to memory space according to the function strength information 11.

Figure 22:
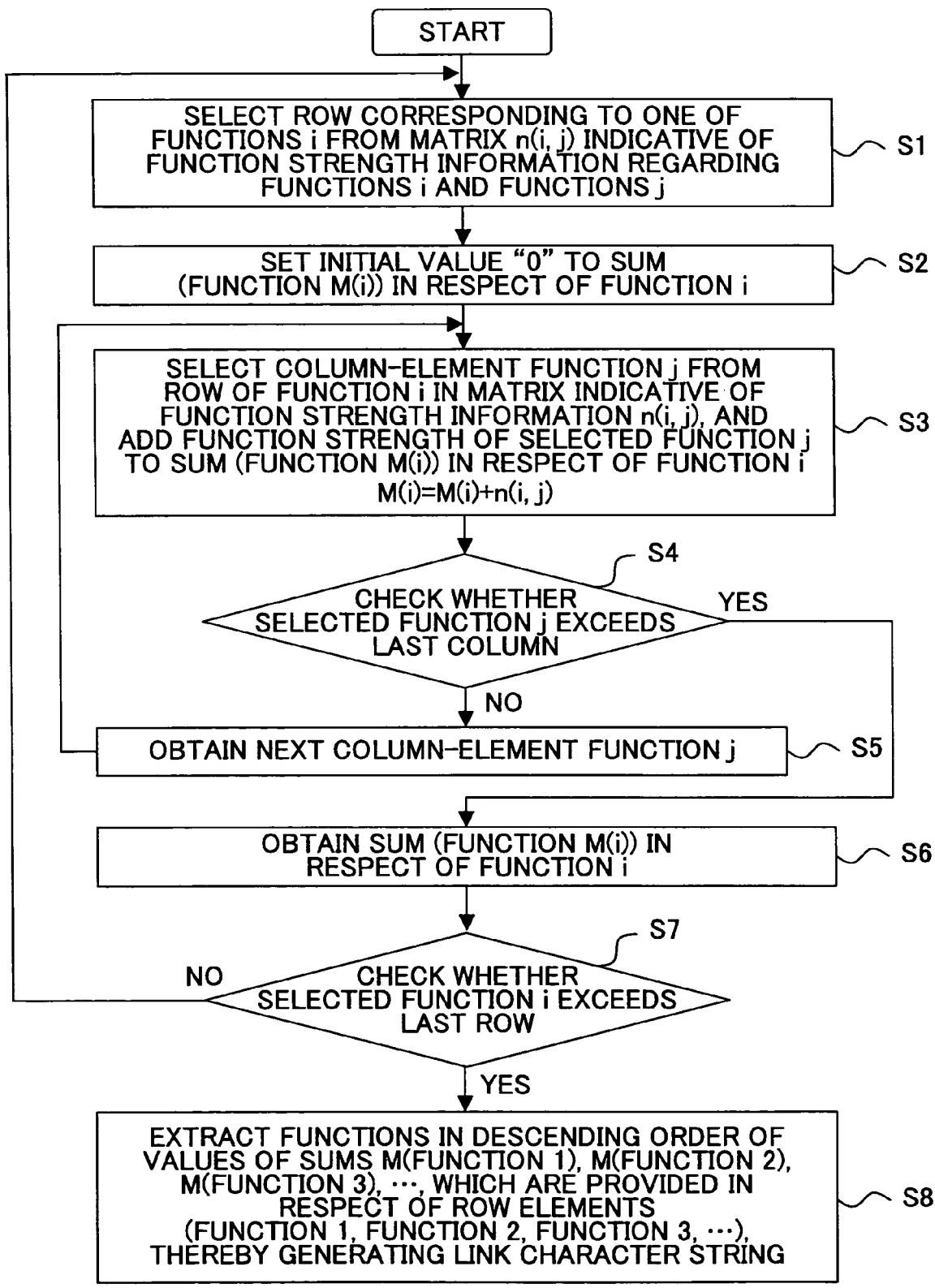
FIG. 22 is a flowchart showing a first embodiment of a function allocating method.

FIG. 22 is a flowchart showing a first embodiment of a function allocating method. In the first embodiment, functions are arranged successively in a descending order of the magnitude of function strength information.

At step S1, a row corresponding to one of the functions i is selected from a matrix n(i, j) indicative of function strength information regarding the functions i and the functions j. The function i selected at the beginning is the function at the top row.

At step S2, a sum (function M(i)) in respect of the function i is initially set to "0".

At step S3, a column-element function j is selected from the row of the function i in the matrix indicative of the function strength information n(i, j). The function j selected at the beginning is that of the leftmost column where i≠j. The function strength of the selected function j is added to the sum (function M(i)) in respect of the function i.

At step S4, a check is made as to whether the selected function j exceeds the last column. If it does, the procedure goes to step S6. Otherwise, the procedure goes to step S5.

At step S5, a next column-element function j is obtained. The procedure then goes back to step S3 to repeat the subsequent steps.

At step S6, the sum (function M(i)) in respect of the function i is obtained.

At step S7, a check is made as to whether the selected function i exceeds the last row. If it does, the procedure goes to step S8. Otherwise, the procedure goes back to step S1, followed by executing the same processes with respect to the function i of the next row.

After the steps described above are completed, the function M(i) (the sum of the function strength information 11 in respect of each function i) is obtained as shown in FIG. 23 with respect to the function strength information 11 of FIG. 4. The function M(i) corresponds to the sum of the numbers of cache misses that occur when other functions are allocated to the same cache line as the function i.

At step 58, functions are extracted in a descending order of the value of the sum M(i), which is provided in respect of the row elements (the functions i: i=1, 2, ... ), thereby generating a link character string. Namely, the functions are arranged in the descending order of the value of M(i). FIG. 24 is an illustrative drawing showing a sequence of functions that are arranged according to the first embodiment of the function allocating method when the function strength information 11 of FIG. 4 is used.

The first embodiment of the function allocating method successfully prevents functions having strong function strength information 11 with respect to each other from being allocated on the same cache line (the same cache line occupying different logical addresses). Since the same cache line is allocated cyclically at intervals equivalent to the cache size in the memory space having consecutive addresses, the allocation of functions having large function strength information 11 ahead of the allocation of other functions makes it possible to finish allocating these functions having the large function strength information 11 before the same cache line appears next time. This insures that cache conflict does not occur.

The above description has been provided by use of the function strength information 11 of the first embodiment (n(i, j)). Functions can as well be allocated in the same manner when the function strength information 11 of the second through fourth embodiments (n*(i, j), n**(i, j), and n#(i, j)) is used.

In the flowing, a description will be given of a second embodiment of a method of allocating functions to memory space according to the function strength information 11.

Figure 25:
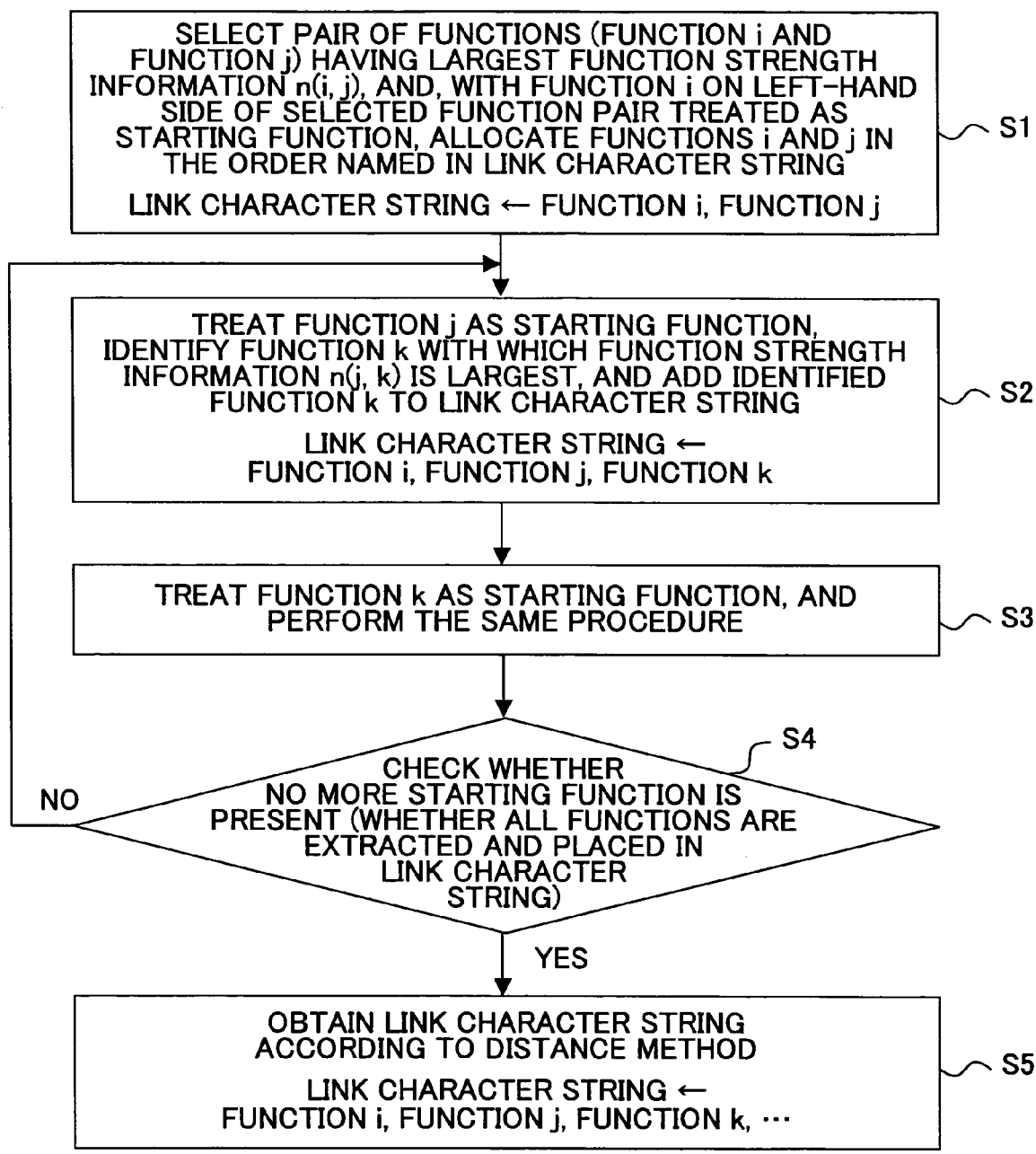
FIG. 25 is a flowchart showing a second embodiment of the function allocating method.

FIG. 25 is a flowchart showing the second embodiment of the function allocating method. In the second embodiment, the function strength information n(i, j) of individual functions is taken into consideration in stead of the sum, and a pair of functions that would bring about cache misses most frequently are allocated next to each other, thereby eliminating cache conflict.

At step S1 of FIG. 25, a pair of functions (function i and function j) having the largest function strength information n(i, j) are selected. The function i on the left-hand side of the selected function pair is treated as a starting function, and the functions i and j are allocated in the order named in the link character string.

At step S2, the function j is treated as the starting function, and a function k with which the function strength information n(j, k) is the largest is identified. In so doing, the function k is selected from remaining functions excluding the functions already selected in the link character string. The identified function k is added to the end of the link character string.

At step S3, the function k is treated as the starting function, and the same procedure is performed.

At step S4, a check is made as to whether no more starting function is present (whether all the functions are extracted and placed in the link character string). If the starting function still exist, the procedure goes back to step S2 to repeat the subsequent steps.

At step S5, the link character string is obtained.

In the example of the function strength information 11 of FIG. 4, n(C, D) has the largest strength information. With the function C thus chosen as the starting function, the function D having the largest strength information is selected. With the function D then chosen as the starting function, the function B having the largest strength information is selected (the function C that has already been selected is not included in this selection process). By the same token, with the function B taken as the starting function, the function E having the largest strength information is then selected. With the function E chosen as the starting function, the function F having the largest strength information is selected. With the function F picked as the starting function, finally, the remaining function A is selected. FIG. 26 is an illustrative drawing showing a series of functions allocated according to the second embodiment of the function allocating method when the function strength information 11 of FIG. 4 is used.

The above description has been provided by use of the function strength information 11 of the first embodiment (n(i, j)). Functions can as well be allocated in the same manner when the function strength information 11 of the second through fourth embodiments (n*(i, j), n**(i, j), and n#(i, j)) is used.

When two or more functions have the same function strength information, a resulting arrangement of functions may greatly differ depending on which one of the functions is selected first. Where there are functions having the same function strength information, thus, certain criteria may be provided for selecting a function. For example, a user may determine an arrangement of functions. Alternatively, functions having smaller function size may be given priority, or functions that are called more often than others may be given priority.

In the second embodiment of the function allocating method as describe above, function size, in addition to the strength information, may be taken into account. Based on the idea that the smaller the function size, the closer situated the functions should be, the value "strength information/size" is defined, and functions are successively selected for allocation in a descending order of the defined values.

In the function allocating methods described heretofore, the functions are allocated in a selected sequence without taking into account cache lines in the memory space. On the other hand, the third embodiment of the function allocating method described in the following allocates functions on a cache-line-specific basis by use of the function strength information 11.

Figure 27:
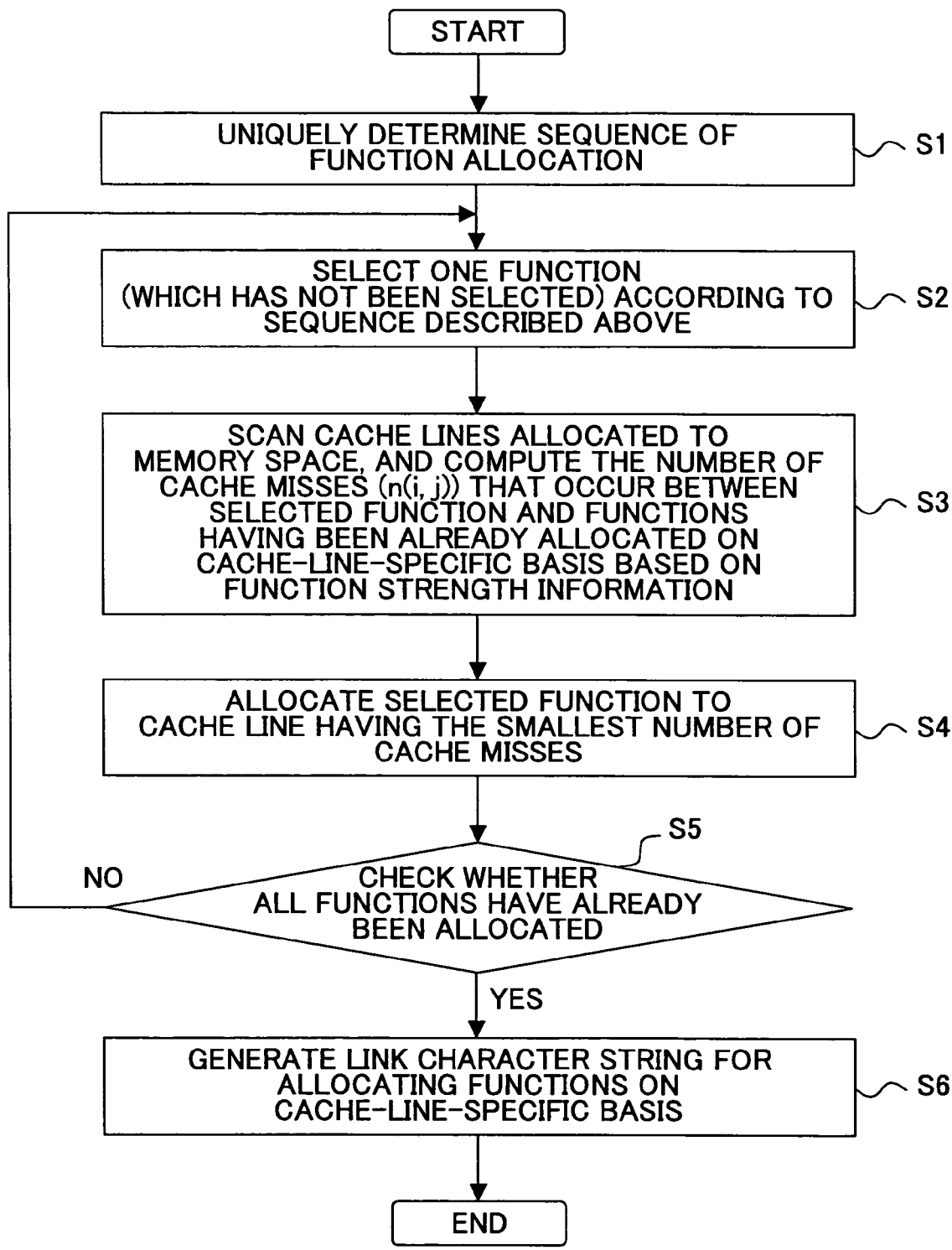
FIG. 27 is a flowchart showing a third embodiment of the function allocating method.

FIG. 27 is a flowchart showing the third embodiment of the function allocating method. In the third embodiment, functions are successively allocated to cache lines such that the cache lines for allocation are selected based on the function strength information 11 in a descending order of the number of cache misses At step S1 of FIG. 27, the sequence of function allocation is uniquely determined. For example, the sequence of allocation may be a descending order of M(i) that corresponds to the sum of the numbers of cache misses in the same manner as in the first embodiment of the function allocating method. The sequence is arbitrary as long as it can be uniquely determined. For example, the sequence may be a descending order of the number of self-calls (n(i, i)).

At step S2, a function (which has not been selected) is selected according to the sequence described above.

At step S3, the cache lines allocated to memory space are scanned, and the number of cache misses (n(i, j)) that occur between the selected function and functions having been already allocated is computed on a cache-line-specific basis based on the function strength information 11. At step S4, the function selected at step S2 is allocated to the cache line having the smallest number of cache misses computed at step S3. The processes performed at step S3 and step S4 will be described later in further detail.

At step S5, a check is made as to whether all the functions have already been allocated. If all the functions have already been allocated, the procedure goes to step S6. If an unallocated function still remains, the procedure goes back to step S2 for further execution of the subsequent steps.

At step S5, a link character string for allocating functions on a cache-line-specific basis is generated. With this, the procedure for allocating all the functions to memory space by taking into account cache lines comes to an end.

Figure 28:
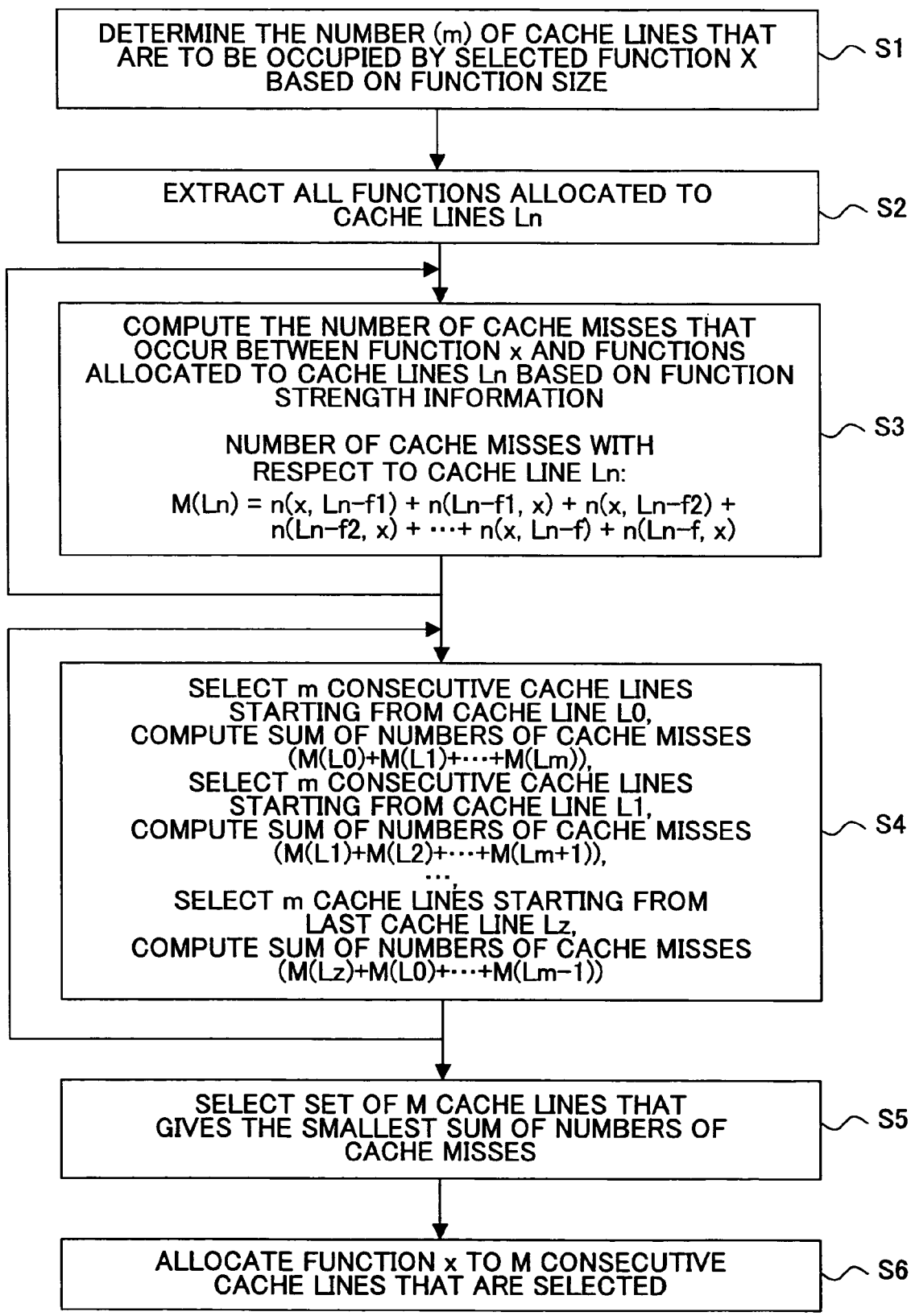
FIG. 28 is a flowchart showing a process of computing the number of cache misses on a cache-line-specific basis and allocating functions as performed at steps S3 and S4 of FIG. 27.

FIG. 28 is a flowchart showing a process of computing the number of cache misses on a cache-line-specific basis and allocating functions as performed at steps S3 and S4 of FIG. 27. In this example, z cache lines L1 through Lz are provided.

At step S1, the number m of cache lines that are to be occupied by a selected function x is determined based on the function size.

At step S2, all the functions allocated to the cache lines Ln (n=1 to z) are extracted. Since information about cache lines used for allocation are stored in an internal table at the time of function allocation, information about the already-allocated functions is available with respect to each cache line Ln. Based on this information, all the functions allocated to the cache lines Ln (n=1 to z) can be extracted. The functions allocated to the cache line Ln are denoted as Ln-f1, Ln-f2, Ln-f3, . . . , and Ln-f.

At step S3, the number of cache misses that occur between the function x and the functions allocated to the cache lines Ln (n=1 to z) is computed based on the function strength information. The number M(Ln) of cache misses with respect to the cache line Ln is computed as:

$$M(Ln) = n(x, Ln-f1) + n(Ln-f1, x) +$$
$$n(x, Ln-f2) + n(Ln-f2, x) + \ldots +$$
$$n(x, Ln-f) + n(Ln-f, x).$$

At step S4, m consecutive cache lines are selected, starting from the cache line L0, and the sum of the numbers of cache misses (M(L0)+M(L1)+ . . . +M(Lm)) is computed, followed by selecting m consecutive cache lines starting from the cache line L1, with the sum of the numbers of cache misses (M(L1)+ M(L2)+ . . . +M(Lm+1)) being computed. By the same token, the sum of the numbers of cache misses is computed for every m cache lines, until m cache lines starting from the last cache line Lz are selected, with the sum of the numbers of cache misses (M(Lz)+M(L0)+ . . . +M(Lm−1)) being computed. It should be noted that the first cache line L0 is considered to be a next cache line following the last cache line Lz.

At step S5, a set of m cache lines that gives the smallest sum of the numbers of cache misses according to step S4 is selected. At step S6, the function x is allocated to the m consecutive cache lines that are selected.

In the following, a description will be given of the above-described method of allocating functions on a cache-line-specific basis by using a specific example.

A case in which the functions B, C, D, A, E, and F are allocated in the sequence shown in FIG. 24 will be examined here. In this example, there are 8 cache lines L0 through L7, each of which is comprised of 4 bytes. The size of the function B is 6 bytes, the size of the function C being 10 bytes, the size of the function D 22 being bytes, the size of the function A being 3 bytes, the size of the function E being 5 bytes, and the size of the function F being 10 bytes.

Figures 29, 30:
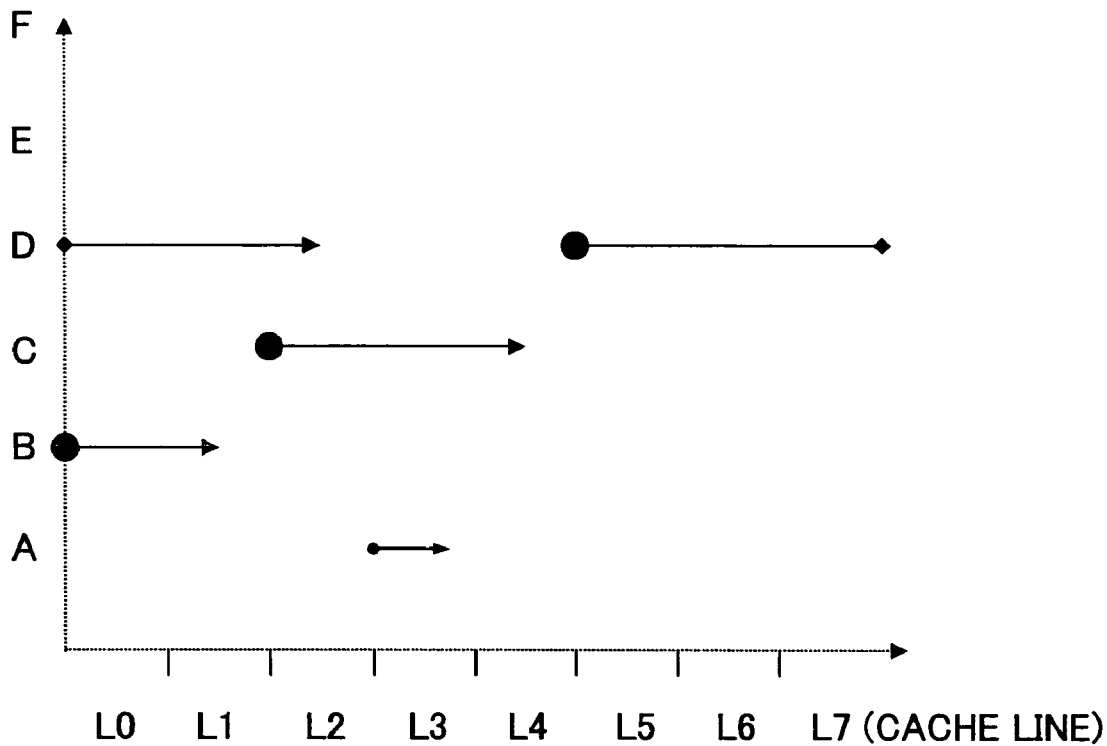
FIG. 29 is an illustrative drawing showing the way the functions B, C, D, and A are successively allocated.
FIG. 30 is a diagram showing the number of cache misses obtained with respect to each cache line.

FIG. 29 is an illustrative drawing showing the way the functions B, C, D, and A are successively allocated. With these functions allocated, a position where the next function E is to be allocated is going to be determined. The function strength information 11 used here is the function strength information shown in FIG. 4.

As described in connection with step S3 of FIG. 28, the number of cache misses between the selected function E and the functions having been already allocated is computed with respect to each cache line based on the function strength information 11 of FIG. 4. In cache line L0, for example, the functions B and D are allocated as shown in FIG. 29, so that the number of cache misses is obtained between the selected function E and these two functions. As can be seen from the function strength information 11 of FIG. 4, B(B, E) is 2, n(E, B) being 1, n(D, E) being 0, and n(E, D) being 0. As the sum of these values, the number of cache misses is obtained as 3.

FIG. 30 is a diagram showing the number of cache misses obtained with respect to each cache line.

The size of the selected function E is 5 bytes, so that it will occupy two cache lines. Accordingly, a pair of cache lines having the smallest sum of the numbers of cache misses is selected from pairs (L0, L1), (L1, L2), (L2, L3), (L3, L4), (L4, L5), (L5, L6), (L6, L7), and (L7, L0). In this example, three pairs (L4, L5), (L5, L6), and (L6, L7) have the sum of cache misses that is zero. From these three pairs, the cache line pair (L4, L5) may be selected, for example.

The above description has been provided by use of the function strength information 11 of the first embodiment (n(i, j)). Functions can as well be allocated in the same manner when the function strength information 11 of the second through fourth embodiments (n*(i, j), n**(i, j), and n#(i, j)) is used.

By use of the method of allocating functions on a cache-line-specific basis as described above, allocation to cache lines is determined with respect to all the functions B, C, D, A, E, and F. In such allocation to cache lines, functions are simply allocated on a cache-line-specific basis, so that logical addresses need to be specified at the time of a link process.

In the following, a description will be given of a method of obtaining physical addresses based on the information about function allocation to cache lines.

Figure 31:
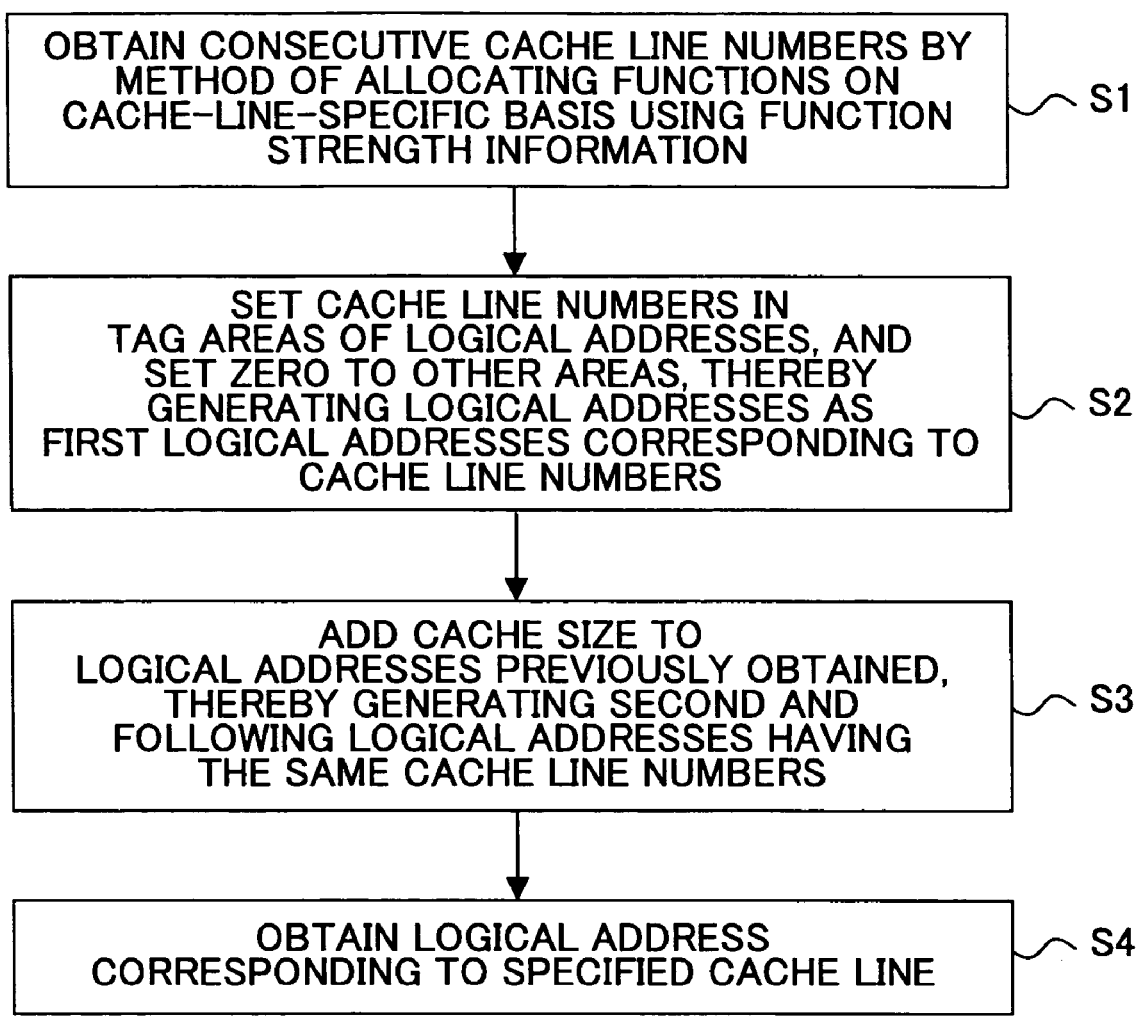
FIG. 31 is a flowchart showing a method of obtaining physical addresses of individual functions based on the allocation of functions to cache lines.

FIG. 31 is a flowchart showing a method of obtaining physical addresses of individual functions based on the allocation of functions to cache lines.

At step s1, consecutive cache line numbers are obtained by the method of allocating functions on a cache-line-specific basis using function strength information. Namely, cache lines to which a function is allocated are obtained with respect to each function.

At step S2, the cache line numbers are set in the tag areas of logical addresses, and other areas are set to zero, thereby generating logical addresses as the first logical addresses corresponding to the cache line numbers.

Figures 32A, 32B, 33:
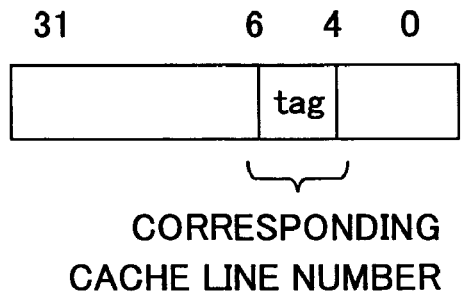
FIGS. 32A and 32B are illustrative drawings showing the structure of a logical address and a conversion table for converting cache line numbers into logical addresses, respectively.
FIG. 33 is a diagram drawing showing the distribution of cache-line-specific execution time.

FIGS. 32A and 32B are illustrative drawings showing the structure of a logical address and a conversion table for converting cache line numbers into logical addresses. As shown in FIG. 32A, 8 cache lines are specified by the fourth through sixth bits (tag area) of the logical address. As shown in FIG. 32B, the cache line L0, for example, is allocated to a logical address having the fourth through sixth bits indicating "0". The cache line L1, for example, is allocated to a logical address having the fourth through sixth bits indicating "1". At step S2 of FIG. 31, a cache line number is set to the fourth through sixth bits that form the tag area, and zero is set to the other bits. In this manner, logical addresses (first logical addresses) that provide a base for the cache lines L0 through L7 are obtained.

At step S3 of FIG. 31, the cache size is added to the logical addresses previously obtained, thereby generating the second and following logical addresses having the same cache line numbers. For example, the second logical addresses corresponding to the same cache line numbers are spaced apart by the cache size from the above-described logical addresses forming the base. Accordingly, adding the case size to the logical addresses forming the base will produce the second logical addresses. By the same token, the cache size is added to the preceding logical addresses to obtain corresponding addresses for the third and following logical addresses.

At step S4, a logical address corresponding to a specified cache line is obtained. Namely, a cache line is specified as a destination to which the function of interest is allocated, and the logical address corresponding to this specified cache line is obtained.

With the provision described above, logical addresses to which respective functions are to be allocated are determined.

In the following, a description will be given of a variation of the third embodiment of the function allocating method that allocates functions on a cache-line-specific basis.

The unction allocating method that allocates functions on a cache-line-specific basis as described above does not particularly take into consideration the frequency of execution of cache lines that are occupied by functions. When the size of a function is large and the locality is strong, a particular cache line may be frequently executed while other cache lines are not frequently executed among all the cache lines occupied by this function. In such a case, it is preferable to provide weights on a cache-line-specific basis.

In consideration of this, the number of cache misses derived from the function strength information is broken down according to the distribution of cache-line-specific execution time. FIG. 33 is a diagram drawing showing the distribution of cache-line-specific execution time. The function C, for example, occupies three cache lines. The second cache line has the largest execution frequency of 0.8 whereas the first and third cache lines have a small execution frequency of 0.1.

The number of cache misses that occur when the function j is allocated to the same cache line as that occupied by the function i is represented by n(i, j). In the third embodiment of the function allocating method, n(i, j) is used as it is. When cache-line-specific weights are taken into account, the number of cache misses with respect to a cache line 1 is represented as:

$$\text{Number of Cache Misses} = X(i, l) \times X(j, l) \times n(i, j)$$

Where X(i, l) is the frequency of execution with respect to the function i and the cache line l in FIG. 33. When the function i and the function j occupy the three same cache lines, for example, the numbers of cache misses may be added up with respect to l=0 through 2.

With the cache-line-specific weighting as described above, cache coloring based on finer function strength information is attained.

The above description has been provided by use of the function strength information 11 of the first embodiment (n(i, j)). Weights can as well be provided in the same manner when the function strength information 11 of the second through fourth embodiments (n*(i, j), n**(i, j), and n#(i, j)) is used.

In the description provided above, a ratio of execution has been used as a weighting factor. The cache-line-specific weighting factor is not limited to the ratio of execution, and various cache line indicators such as the number of functions allocated to the same cache line may alternatively be used.

In the following, a process of merging function strength information will be described.

When a program is executed, processing may vary in some cases, depending on the contents of data. In such cases, a plurality of different program execution routes are in existence with respect to a plurality of different data, resulting in the different values of function strength information being obtained with respect to the respective routes. Such different values of function strength information need to be merged.

Various methods are conceivable for the merging of function strength information. For example, weighting factors may be determined on an execution-route-specific basis, and merging may be performed while applying respective weights to function strength information. That is, the merged function strength information may be represented as:

Function Strength Information=$\Sigma(w_i \times D_i)$ where $D_i$ is function strength information in respect of an execution route i, and $w_i$ is a weighting factor for the execution route i.

Figure 34:
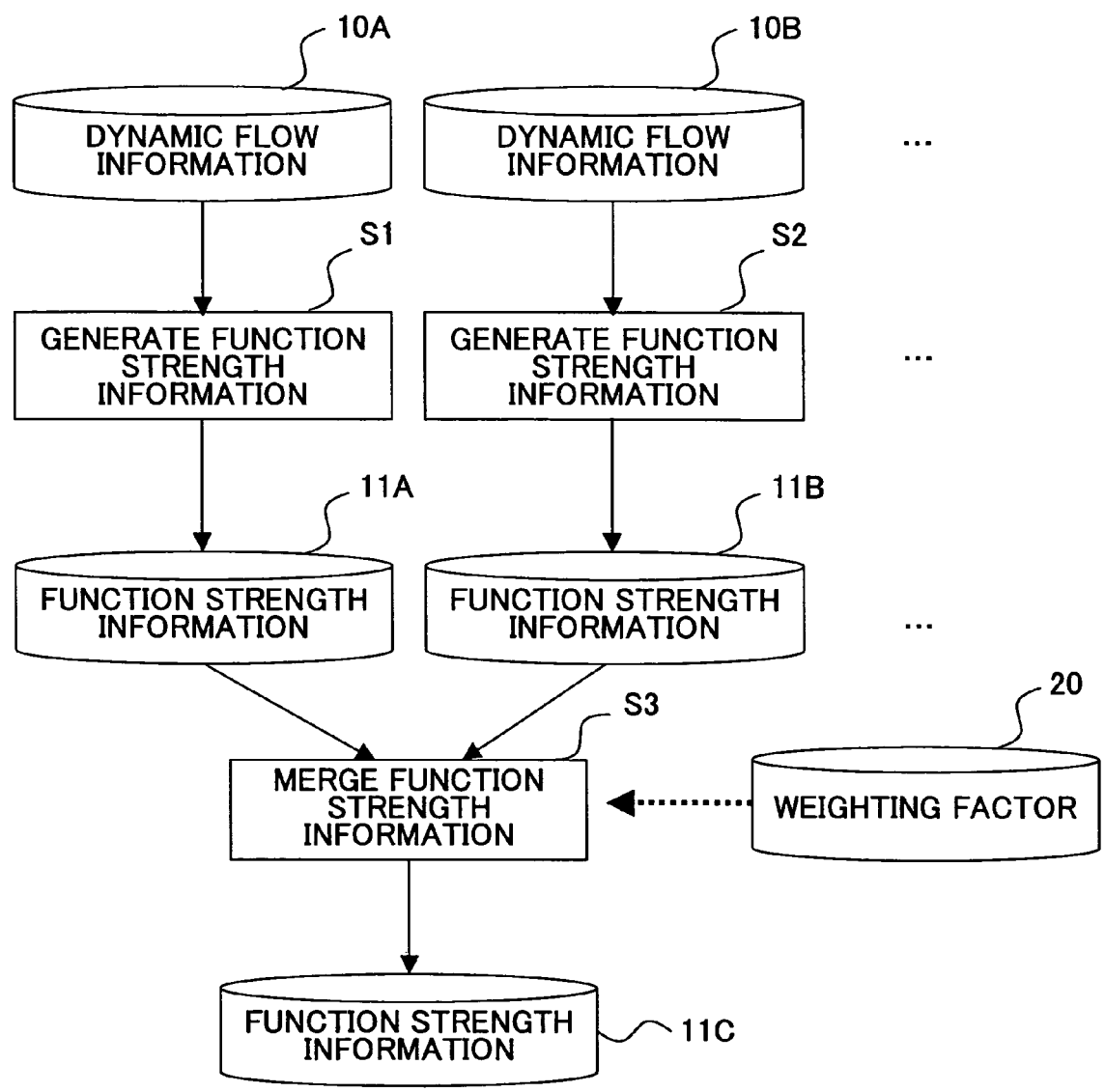
FIG. 34 is a flowchart showing a merging process.

FIG. 34 is a flowchart showing a merging process.

At step S1, function strength information 11A is generated based on a dynamic function flow 10A. At step S2, function strength information 11B is generated based on a dynamic function flow 10B. At step S3, the merging of function strength information is performed by use of the function strength information 11A, the function strength information 11B, and weighting information 20, thereby generating function strength information 11C.

The weighting information may be determined by using various indicators of execution routes such as a ratio of executions, the number of executions of each route, a total of the numbers of function executions within each route, etc.

FIG. 35 is an illustrative drawing showing the construction of an apparatus for performing cache coloring according to the invention.

As shown in FIG. 35, the apparatus for performing the cache coloring method of the invention is implemented as a computer such as a personal computer, an engineering workstation, or the like. The apparatus of FIG. 35 includes a computer 510, a display apparatus 520 connected to the computer 510, a communication apparatus 523, and an input apparatus. The input apparatus includes a keyboard 521 and a mouse 522. The computer 510 includes a CPU 511, a ROM 513, a secondary storage device 514 such as a hard disk, a removable-medium storage device 515, and an interface 516.

The keyboard 521 and mouse 522 provide user interface, and receive various commands for operating the computer 510 and user responses responding to data requests or the like. The display apparatus 520 displays the results of processing performed by the computer 510, and further displays various data that makes it possible for the user to communicate with the computer 510. The communication apparatus 523 is provided for the purpose of communicating with a remote site, and may be implemented by use of a modem, a network interface, or the like.

The cache coloring method of the invention is provided as a computer program executable by the computer 510. This computer program is stored in a memory medium M that is mountable to the removable-medium storage device 515. The computer program is loaded to the RAM 512 or the secondary storage device 514 from the memory medium M through the removable-medium storage device 515. Alternatively, the computer program may be stored in a remote memory medium (not shown), and is loaded to the RAM 512 or the secondary storage device 514 from the remote memory medium through the interface 516.

Upon user instruction for program execution entered through the keyboard 521 and the mouse 522, the CPU 511 loads the program to the RAM 512 from the memory medium M, the remote memory medium, or the secondary storage device 514. The CPU 511 executes the program loaded to the RAM 512 by use of a free space of the RAM 512 as a work area, and continues processing while communicating with the user as such a need arises. The ROM 513 stores therein control programs for the purpose of controlling basic operations of the computer 510.

By executing the computer program, the cache coloring method as described in the embodiments described heretofore are performed. This environment for performing the cache coloring method is the cache coloring apparatus.

Further, the present invention is not limited to these embodiments, but various variations and modifications may be made without departing from the scope of the present invention.

What is claimed is:

1. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ indicating a number of sections in which a function j is referred to at least once, said sections being each defined as a section extending from given reference to function i to next reference to the function i in the dynamic function flow, and said $n(i, j)$ indicating a total number of references to the function i if i=j.

2. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ indicating a sum of ratios added up with respect to all sections, each of said ratios being defined as a ratio of a number of references to a function j to a total number of references to all functions in a corresponding one of the sections, and said sections being each defined as a section extending from given reference to function i to next reference to the function i in the dynamic function flow.

3. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ indicating a sum of numbers added up with respect to all sections, each of said numbers being defined as a number of references to a function j in a corresponding one of the sections, and said sections being each defined as a section extending from given reference to function i to next reference to the function i in the dynamic function flow.

4. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ indicating a sum of an inverse of distances added up with respect to all sections, each of said distances being defined as a distance from a function i positioned at a start of a corresponding one of the sections to a function j first referred to in the corresponding one of the sections, and said sections being each defined as a section extending from given reference to function i to next reference to the function i in the dynamic function flow.

5. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ having a value that increases as a possibility of instruction cache conflict increases between a function i and a function j at the time of program execution, and wherein said allocating the plurality of functions to memory space successively allocates functions i to the memory space to continuously fill the memory space in a descending order of a sum of the values of $n(i, j)$ that are added up with respect to all functions.

6. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ having a value that increases as a possibility of instruction cache conflict increases between a function i and a function j at the time of program execution, and wherein said allocating the plurality of functions to memory space successively allocates pairs of functions i and j to the memory space to continuously fill the memory space in a descending order of the values of $n(i, j)$.

7. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein said function strength information is represented as matrix information $n(i, j)$, said $n(i, j)$ having a value that increases as a possibility of instruction cache conflict increases between a function i and a function j at the time of program execution, and wherein said allocating the plurality of functions to memory space allocates the plurality of functions to a plurality of cache lines in the memory space by referring to $n(i, j)$ with respect to each of the cache lines such that cache conflict is reduced.

8. The method as claimed in claim 7, wherein said allocating the plurality of functions to memory space evaluates the cache conflict between a given one of the plurality of functions and other functions by giving different weights to respective cache lines that are occupied by said given one of the plurality of functions.

9. A method of performing cache coloring for a program including a plurality of functions that are called during execution of the program, comprising:

tracing an entrance and exit of the functions to generate a dynamic function flow that represents a sequence in which the plurality of functions are called during the execution of the program;

generating function strength information in response to the dynamic function flow, said function strength information including information about runtime relationships between any given one of the plurality of functions and all the other ones of the plurality of functions in terms of a way the plurality of functions are called; and allocating the plurality of functions to memory space in response to the function strength information such as to reduce instruction cache conflict, wherein different dynamic function flows are in existence with respect to respective executions of the program, and said generating function strength information is performed to generate different values of function strength information corresponding to respective dynamic function flows and to generate merged function strength information by adding the different values of function strength information with respective weights attached thereto, said allocation of the plurality of functions to the memory space being performed based on the merged function strength information generated by adding the different values of function strength information.

* * * * *